(12) United States Patent
Lam

(10) Patent No.: US 10,387,170 B1
(45) Date of Patent: Aug. 20, 2019

(54) USER PROGRAMMABLE BUILDING KIT

(76) Inventor: Peter Ar-Fu Lam, Torrance, CA (US)

( * ) Notice: Subject to any disclaimer, the term of this patent is extended or adjusted under 35 U.S.C. 154(b) by 0 days.

(21) Appl. No.: 10/988,822

(22) Filed: Nov. 15, 2004

(51) Int. Cl.
*G06F 13/38* (2006.01)
*G06F 9/448* (2018.01)

(52) U.S. Cl.
CPC .......... *G06F 9/4498* (2018.02); *G06F 13/385* (2013.01)

(58) Field of Classification Search
CPC .. A63H 17/395; A63H 30/04; A63H 2200/00; A63H 3/28; G09B 19/0053; G06F 8/665; A63F 2009/2433; A63F 2009/2489
USPC ............................................ 700/78; 367/108
See application file for complete search history.

(56) References Cited

U.S. PATENT DOCUMENTS

| | | | | |
|---|---|---|---|---|
| 3,942,149 A * | 3/1976 | Westfall, Jr. | .................. | 367/108 |
| 4,050,256 A * | 9/1977 | Phillips et al. | ............... | 405/299 |
| 4,521,845 A * | 6/1985 | Schwefel | ............. | G05B 19/425 318/568.1 |
| 4,712,184 A * | 12/1987 | Haugerud | ......................... | 701/1 |
| 5,168,441 A * | 12/1992 | Onarheim | .......... | G05B 19/0426 700/17 |
| 5,221,976 A * | 6/1993 | Dash et al. | ................... | 358/486 |
| 5,568,882 A * | 10/1996 | Takacs | ............................ | 222/61 |
| 5,648,897 A * | 7/1997 | Johnson | ............... | G05D 1/0038 700/259 |
| 5,656,907 A * | 8/1997 | Chainani et al. | ............. | 318/587 |
| 5,697,829 A * | 12/1997 | Chainani et al. | ............. | 446/436 |
| 5,724,074 A * | 3/1998 | Chainani et al. | ............. | 345/474 |
| 5,752,880 A * | 5/1998 | Gabai et al. | ...................... | 463/1 |
| 5,784,542 A * | 7/1998 | Ohm et al. | ..................... | 700/260 |
| 5,867,818 A * | 2/1999 | Lam | ............................. | 704/270 |
| 6,061,516 A * | 5/2000 | Yoshikawa et al. | .......... | 717/109 |
| 6,076,784 A * | 6/2000 | Selker | .......................... | 248/118 |
| 6,167,383 A * | 12/2000 | Henson | ................ | G06Q 10/087 703/13 |
| 6,206,745 B1 * | 3/2001 | Gabai et al. | ..................... | 446/91 |
| 6,356,867 B1 * | 3/2002 | Gabai et al. | .................. | 704/270 |
| 6,421,571 B1 * | 7/2002 | Spriggs et al. | ................. | 700/17 |
| 6,450,414 B1 * | 9/2002 | Dartnall et al. | ............... | 237/2 A |
| 6,546,494 B1 * | 4/2003 | Jackson et al. | ............... | 713/300 |
| 6,556,221 B1 * | 4/2003 | Shima et al. | ................. | 715/764 |
| 6,839,600 B2 * | 1/2005 | Spenser | ................ | G06Q 10/10 700/17 |
| 6,850,018 B2 * | 2/2005 | Zacher et al. | ........... | 318/400.01 |
| 7,114,554 B2 * | 10/2006 | Bergman | ............. | G05B 19/106 165/238 |
| 7,574,690 B2 * | 8/2009 | Shah | ..................... | G06F 11/323 700/83 |
| 2002/0102910 A1 * | 8/2002 | Donahue et al. | ............. | 446/465 |
| 2002/0120362 A1 * | 8/2002 | Lathan et al. | ................ | 700/245 |
| 2004/0139951 A1 * | 7/2004 | Fisher et al. | ................... | 123/679 |

OTHER PUBLICATIONS

Grow With Me, Inc. (1999) www.EasyFormat.com.*
Wikipedia, http://en.wikipedia.org/wiki/Transducer.*

(Continued)

*Primary Examiner* — Sean Shechtman

(57) ABSTRACT

A programmable retail building kit comprising a controller unit to control a set of accessory article members is provided to enable a user to design, build and program a article. This retail building kit is also provided with a remote controller having a visual display unit and a sound transducer for the user to interface with the controller unit.

26 Claims, 13 Drawing Sheets

(56) References Cited

OTHER PUBLICATIONS

Lego, 1999 Lego Mindstorms Robotics Invention System 1.5, shopgoodwell.com, 1999, 4 pages.*
Andreas Junghans et al., Collaborative Robotics with Lego Mindstorms, 2001, 71 pages.*
Chris DiGiano et al., Integrating learning supports into the design of visual programming systems, 2001, 20 pages.*
Beland et al., LEGO Mindstorms the Structure of an Engineering (R)evolution, Dec. 2000, 44 pages.*
Fabio Carusi et al., Apr. 2004, IEEE, p. 1820-1825.*
ScoutSDK, Lego MindStorms Scout Software Developers Kit User Guide & Reference, Nov. 1999, Lego, 68 pages.*

* cited by examiner

USER PROGRAMMABLE BUILDING KIT

FIELD OF THE INVENTION

The present invention relates to a retail building kit that enables a user who purchased the retail building kit to design, build and program an article making use of a controller unit to control a selected set of accessory article members.

BACKGROUND OF THE INVENTION

Traditional building kits require users to learn the detail technical structure about a microprocessor or microcontroller, assembly language to program the microprocessor or microcontroller and the design of supporting electronics circuit. Assembly language is extremely difficult for beginners to handle and debug. Supporting circuit design such as LCD display also requires in depth knowledge of electronics design skill. It is the objective of this invention to provide a building kit that allows a nonprofessional user to learn and start trying to build his own design or invention within a day with a user friendly programming language Easy Format, previously invented by the applicant.

SUMMARY OF THE INVENTION

It is the intention of this invention to provide a complete solution of programmable building kits to support invention or hobby article building of non engineering professional people. This solution is supported with a programming method invented by the applicant as disclosed in U.S. Pat. No. 5,867,818, named Easy Format in the trade. Easy Format is an established event driven programming method very suitable for supporting invention or hobby building kits because users are not required to learn the assembly language instructions of a microprocessor or microcontroller. Easy Format programming method, programming language or compiling software, is very different as compared with traditional programming softwares. It has variable precomputer and post computer activities depend on the nature of the program to be written with the programming language. When compared with assembly language and other high level programming languages, programs written in Easy Format are very easy to be read and interpreted by other programmers, making it a programming language of choice for users to share and discuss software programs with other building kit hobbyists. When compared with 2 dimensional flow chart type of programming languages, Easy Format is superior because it provides means to structure multiple dimensions program flow with two to three tables. Programming with Easy Format is simply a job of filling up tables elements according to the program flow structured inside the mind of the programmer.

Since the traditional form of Easy Format has already become an industrial standard and reference instructions had been published by U.S. Pat. No. 5,867,818 and many Easy Format licensees in the public domain, further in depth description of the traditional Easy Format software is not provided in detail in this application. In summary, Easy Format which is equivalent to the non-trademark form as "easy programming" herein; is a programming language, or a programming method that enables a user to program a microprocessor or microcontroller IC or a controller unit to interact with external circuitry. This programming software, language or method is specifically defined to comprise the following programming steps (a) to (f):

(a) defining m input channels for said controller unit to receive external data or signals, wherein m is an integer equal or greater than one;
(b) defining n output channels for said controller unit to transmit data or signals, wherein n is an integer equal or greater than one;
(c) specify x configuration state, wherein each configuration state defines the configuration of at least one input channel and/or one output channel and x is an integer equal or greater than one;
(d) specify y events to be executed by said controller unit, wherein y is an integer equal or greater than one;
(e) specify an event to be executed when the signal or data received by an input channel satisfied a predefined qualifying condition and
(f) enable an event to switch from a current configuration state to another configuration state. Improvements of Easy Format or easy programming software provided for applying the programming steps (a) to (f) herein is described as an advanced or improved Easy Format or easy programming software or system; wherein the advanced features of this advanced or improved Easy Format or easy programming software or system are to be further defined or described by the subject specification and claims. Easy Format programming is also commonly abbreviated in the trade as easy programming.

Significant improvements to the traditional Easy Format programming method are introduced in this patent application to support the special application of programming building kits for nonprofessional people. These improvements make use of enhanced interactive visual features of computer screen to minimize programming labor and errors. User-friendly symbols and graphic labels are provided on a computer screen to facilitate composing an Easy Format program. The programming process is further enhanced by providing very special pull down menu and drag and drop processes customized to the nature of the Easy Format programming method. Special new instructions are added for the controller unit to handle serial data communication as well as command to directly control building kit components such as motors, light bulbs, directly sending message to display on LCD panels and controlling interface/protocol for a building kit controller unit to communicate with a remote device such as a wireless phone. Most push button keys of a remote controller provided in this system are user programmable and therefore a label area is added for the user to define the nature of the input keys.

Although it is disclosed a preferred embodiment for a user to program the Easy Format program at a computer and then transfer the executable code to a flash memory for interfacing a controller unit, various methods of downloading the executable code to the controller unit known to the industry is considered to be within the scope of this invention.

In order to reduce the number of connecting wires required between the controller unit and the accessory article members, and to reduce the real time work load of the main controller unit, multiple microcontrollers or microcontrollers are added to the internal structure of the accessory article members to handle the local jobs of the accessory article members, such as adjusting motor speed, converting potentiometer readings into digital data, encoding and decoding audio and/or visual data. The benefits of these features for providing the special applications of generic building kits are demonstrated in a robot building project disclosed in this application.

It should also be pointed out that most building blocks or accessory article members of the kit disclosed are configured to mount on a piece of core material with screws or nails. After experimenting different materials and designs in searching a perfect core structure for this research, it was discovered that wood block is a very preferred core mounting material. Wood blocks, which are low cost and widely available in many homes, also provide another significant advantage, as wood is easy to be tailored to the desirable shape of the article to be built. Different wood blocks are also easy to be combined or glued to form the special shape required for special article building projects.

An advanced remote control member coming close to the structure of the controller unit is added to the system for a user to effectively communicate or to provide commands to the controller unit. This remote control member is connected to the controller unit by cable wire or by wireless method such as radio frequency, infrared, or ultrasonic communication designs. The remote control member may also be equipped with a LED or LCD display panel or speakers for providing audio/visual communication with the controller unit. In another application sample, the remote control member can be represented by a mobile phone. In this case the building kit will require a dialing circuit and/or a modem circuit for the controller unit to communicate with the wireless phone. This dialing and/or modem circuit may be installed inside the controller unit or positioned externally as an external accessory article member. Accordingly the accessory article members in this system are defined as any modular members required to support the controller unit to form the article. Accessory article members include any mechanical components structured to be mounted together to form the article.

The novel features of the invention are set forth with particularly in the appended claims. The invention will be best understood from the following description when read in conjunction with the accompanying drawings.

Figures 1A, 1B:
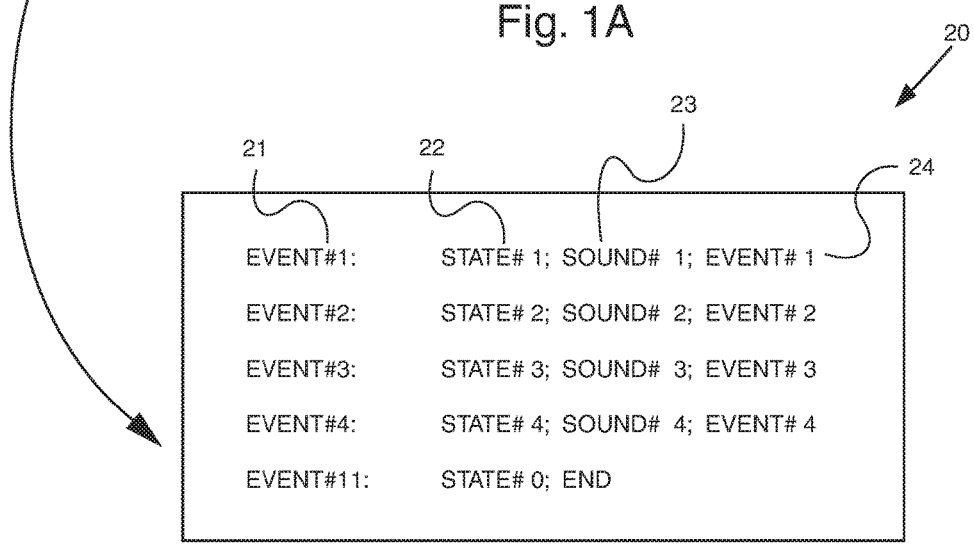
FIG. 1A demonstrated a state table of an Easy Format program.
FIG. 1B demonstrated a path table of an Easy Format program.

While some numeric identifiers were described in the following specification, additional numeric identifiers not mentioned in this specification were reserved to facilitate future communication purpose when required. These drawing identifiers included but not limited to the element identifier 16 of FIG. 1A, 25 of FIG. 1 B, 207, 220, 229 of FIGS. 2; and 301, 316, 328, 402, 406, 408, 410, 422 to 428, 430, 432, 502, 503, 525 to 528, 530, 531, 600, 602, 608, 800, 802, 900, 920, 927-929, 1100, 1107, 1108, 1111, 1112, 1251 to 1257 of the subsequent drawings.

DESCRIPTION OF PREFERRED EMBODIMENTS

Easy Format is an established programming method invented by the applicant as disclosed in U.S. Pat. No. 5,867,818. This programming method had been licensed by many different microprocessor or microcontroller IC supplying companies and is now an industrial standard to program microprocessor or microcontroller ICs used in electronics toys and consumer electronics products. An example of the Easy Format programming software is represented by the programming format of FIG. 1A and 1B, in accordance with the present invention. The programming format comprises of two fields or tables. The first field is represented by Table 10 comprises of a first co-ordinate 12 listing all the eight I/O terminals and a second co-ordinate 11 listing all the I/O configuration states. Each element of the table represents the configuration of a terminal at a particular I/O configuration state. The first part of the programming process is to specify each element of the table with one of the eight symbols R, F, 1, O, X, H, L, and P as defined. Whenever a terminal is configured as an input terminal, a numbered event is to be specified. This is the event to be executed when a qualified input signal is received. Element 13 "F:E11" denotes the configuration of terminal 1 (Pin 1) of I/O State#1, whereas "F" denotes that the qualification signal is characterized by a falling edge, E11 denotes Event#11 is to be executed when a falling edge signal is received by terminal 1. Element 14 denotes that when a rising edge signal is detected by terminal 2, Event#2 is to be executed. Element 15 "X" denotes terminal 6 is a don't care terminal. Whenever an input terminal is configured to "X", any trigger signal received by the terminal is ignored. Whenever an output terminal is configured to "X", the output terminal is configured to have a high output impedance.

Attention is now directed to Table 20, which comprises the second part of the programming format and defines the paths to be executed. A path, alternately rephrased as an event, may comprise of one or more paths or events. Each path or event when executed performs a task such as generating an output signal, modifying an active I/O configuration state, initiate a timer counter or direct the execution to another path. Table 20 enlists the detail contents of all the paths and events to be executed according to Table 10. Line 21 denotes that the path named Event#1 comprises of three events 22 (STATE#1), 23 (SOUND 1), and 24 (EVENT#1). Suppose I/O State#0 is the active I/O configuration state; the reception of a rising edge signal by terminal 1 triggers the execution of Event#1; that is, sub-events 22, 23 and 24 will be executed in order. Event 22 denotes that the active I/O configuration state is changed from I/O State#0 to I/O State#1; then follow by the reproduction of the audio signal designated as "SOUND 1". When the reproduction of the sound is completed, sub-event 24 is executed which loop back the execution to "EVENT#1" and replay "SOUND 1" for another cycle. The looping continues until anyone of Terminals 1 to 4 of I/O States#1 receives a qualified signal. For example, when Terminal 1 detects a falling edge signal, the "SOUND 1" looping of Event#1 is interrupted and Event#11 is executed. Event#11 instructs the microprocessor or microcontroller to return to I/O State#0 as the active I/O configuration state. The "END" symbol denotes the end of the event and the control apparatus is in an idle mode awaiting the next qualified input signals to be received as defined by I/O State#0.

At the power up of the control apparatus, an I/O configuration state is defined as the default power up I/O state; that is, the active I/O configuration state right after power up of the control apparatus. A convenient notation is to define I/O State#0 to be the default power up I/O state.

It should be noted that each I/O configuration state has no sequential relationship with each other and table 10 can be arranged in any order. Similarly, any path listed in table 20 also has no sequential relationship with another path unless it is designated as the event of another path as in Line 21. The paths can be numbered in any order and the numbers can be skipped if desired by the programmer. All events having sequential relationship are arranged in a single path line listing. This arrangement enables the programmer to have a much clearer picture of the program when compared with the multiple lines listing of traditional assembly language programming.

Although the program table of FIG. 1 is organized into two fields as described, various modifications in format structure of the programming tables are possible while maintaining the simple to learn and easy traceability nature of the invented programming method. Since the traditional form of Easy Format has already been an industrial standard, reference instructions had been published by U.S. Pat. No. 5,867,818 and many Easy Format licensees in the public domain, accordingly further in depth description of the traditional Easy Format software is not provided in this application. In summary, Easy Format is a programming language, or a programming software that enables a user to program a microprocessor IC or a controller unit to interact with external circuitry. This programming software is defined to comprise the following programming steps (a) to (f):

(a) defining m input channels for said controller unit to receive external data or signals, wherein m is an integer equal or greater than one;

(b) defining n output channels for said controller unit to transmit data or signals, wherein n is an integer equal or greater than one;

(c) specifying x configuration state, wherein each configuration state defines the configuration of at least one input channel and/or one output channel and x is an integer equal or greater than one;

(d) specifying y events to be executed by said controller unit, wherein y is an integer equal or greater than one;

(e) specifying an event to be executed when the signal or data received by an input channel satisfied a predefined qualifying condition and (f) enabling an event to switch from a current configuration state to another configuration state.

Figure 2:
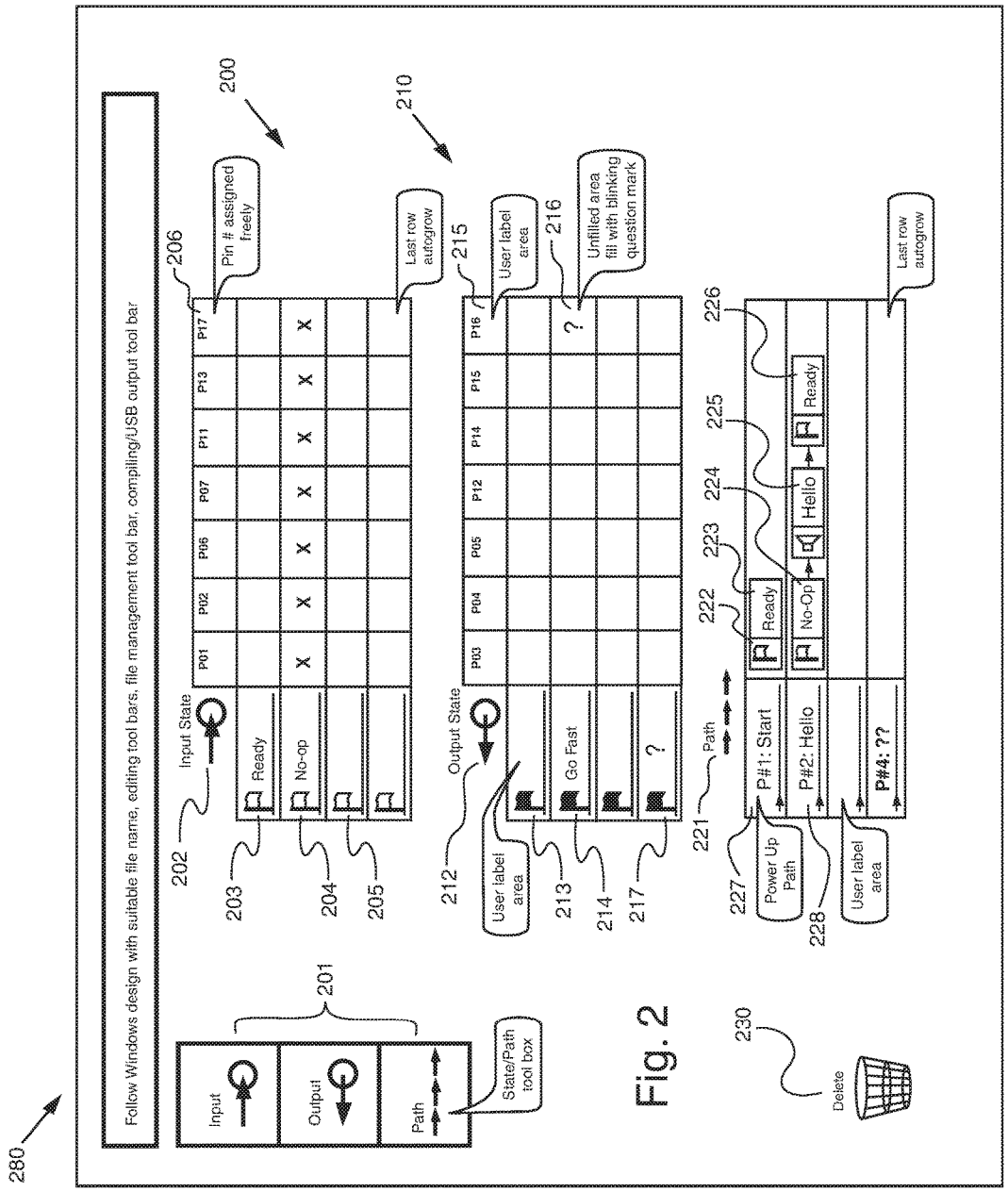
FIG. 2 illustrated a visual form of Easy Format program displayed on a computer screen.

Attention is now directed to FIG. 2, which illustrated a further visual enhancement of the traditional Easy Format software. User-friendly symbols and graphic labels are provided on a computer screen to facilitate composing an Easy Format program. Buttons 201 is a pull down menu to obtain labels of input state, output state or path elements. The sign 202 indicates that the table 200 is an input state table. The label 206 indicates the location of the input ports or pins of the controller unit. Labels 203 to 205 are provided with a special sign or specific color to signal that they are input states. When the state 204 named "No-op" is activated, all the ports P01 to P17 are set to "X", it means all these ports entered into a "don't care" state. The sign 212 indicated table 210 is an output state table. The label 215 indicated the location of the output ports or pins of the controller unit. Labels 213, 214 and 217 are provided by a different sign or different color (as compared with the label of the input states) to indicate that these label direct to output states. Elements 216 and 217 are provided with a blinking question mark to alert the user that an entry is missing or an error had been entered. The sign 221 indicates that table 220 is a path table, which describes the events to be executed when a path is called. Element 227 is a path #1 having a user assigned path name "start". When this path is executed, the input state is set to be active as indicated by the sign 222 and label 223. When the path 228 is activated, three events 224 to 226 will be executed in order. Event 224 set the input state No-op to active. Event 225 generates a voice "Hello". Event 226 deactivate the no-op state 204 and set the input state 203 Ready to active.

Figure 3:
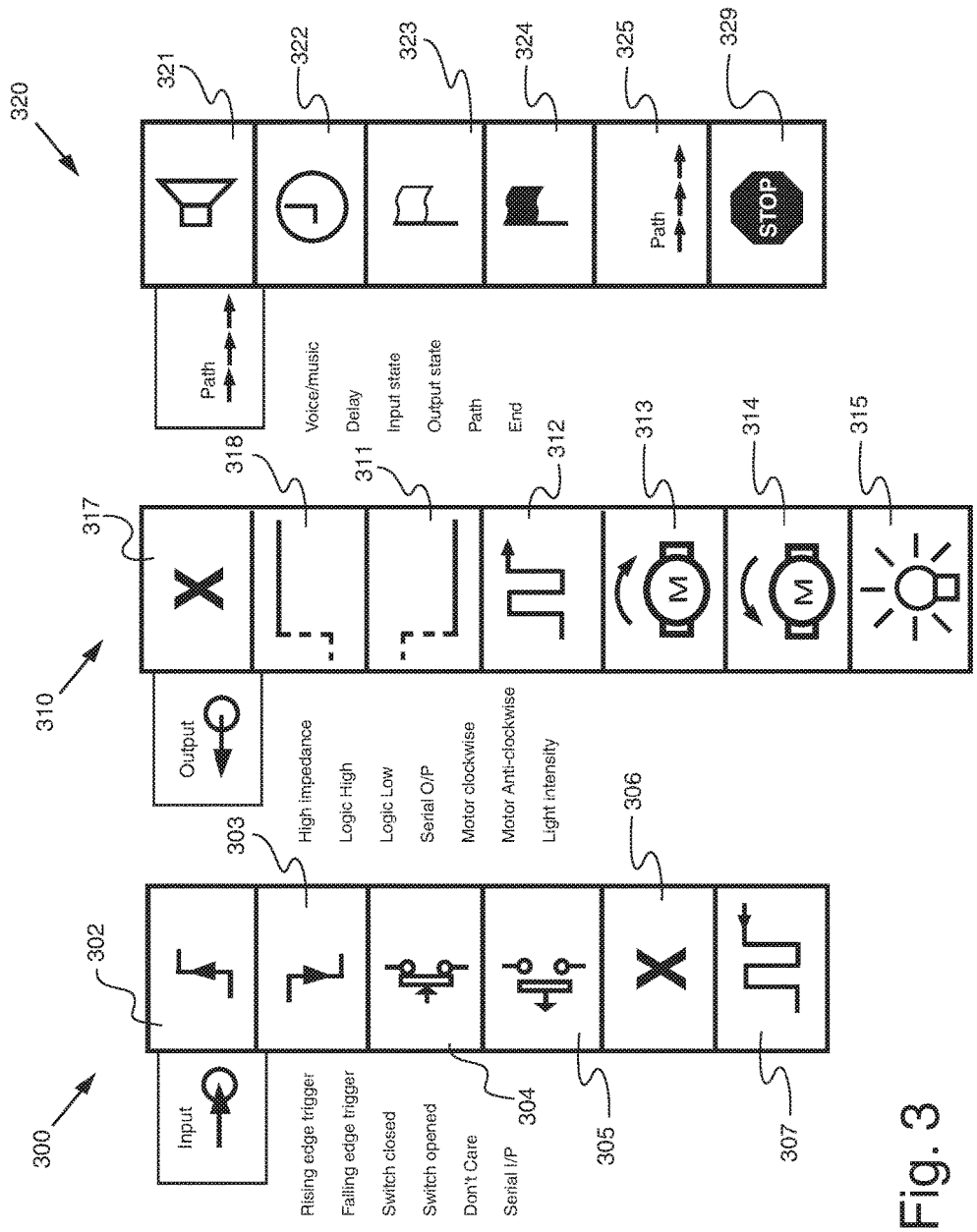
FIG. 3 demonstrated symbols provided to represent input channels, output channels and nature of the path equation elements in an Easy Format program.

Attention is now directed to FIG. 3, which provides the options available when an element of pull down menu 201 of FIG. 2 is triggered. Table 300 illustrates the signs 302 to 307 each represents a different qualifying condition for an input port to be triggered. For example, label 302 indicated that the port is triggered when a rising edge signal is detected. Label 303 indicates a falling edge trigger command. Label 304 indicates the port is triggered when a switch is closed. Label 305 indicates the input port is triggered when a closed switch is opened. Label 306 defines a "don't care" condition ignoring any input trigger from the port, or pin, or channel. Label 307 indicates the port is inputting a serial pulse and the qualifying condition depends on another predefined condition of the serial data received.

Table 310 represents the pull down menu of output ports. Label 317 indicates the output port is set to high impedance. Label 318 indicates the port is set to level high. Label 311 indicates the port is set to level low. Label 312 indicates the port is set to the configuration of a serial output port and the serial data to be sent will depend on the event to be executed. Label 313 indicated that motor control is connected to this port and the motor is instructed to turn clockwise. Label 314 indicates that the motor is instructed to turn anticlockwise. Label 315 indicated a light transducer is controlled by this output channel or port and the light is turned on when this port is set. There are also labels not shown in the table to turn off motor or lighting devices. Table 320 indicated the common labels to be used in a path, which executes a series of events according to the program. Label 321 indicated a sound is to be generated. Label 322 indicates a delay time is required before the next event is executed. Label 323 indicates an input state is to be set active. Label 324 indicates an output state is to be set active. Label 325 indicates the program is going to jump to another path. Label 329 indicates the program will be put to stop and wait for another input trigger to activate another event path. Label elements of these pull down menu can be drag and drop to the appropriate location of the state and path tables during composing of the user-friendlier Visual Easy Format program.

Figure 4:
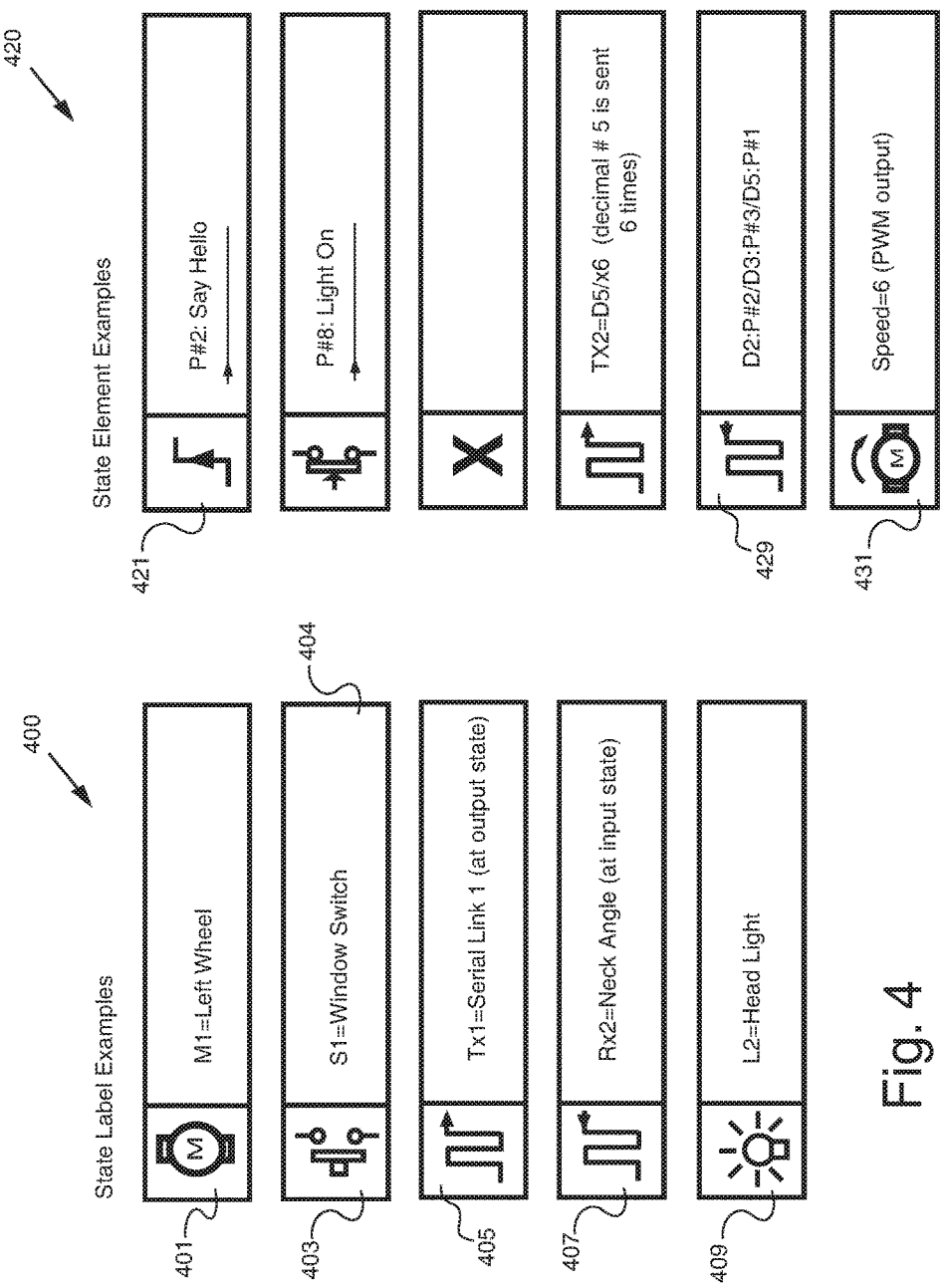
FIG. 4 demonstrated examples of labels to be used in State table of visual Easy Format programming.

Table 400 of FIG. 4 indicates the user-defined information to be filled after a state label is dragged and dropped to the appropriate location of a state table. Label 401 is a motor label obtained from the pull down menu. The user is then required to define the name of the motor. In this case the user defines this motor to be motor #1 representing the motor to drive the left wheel. The user also defines the label 403 to be the window switch S1 when he is making use of the building kit to design and build a home security system. Similarly, all the labels 405, 407 and 409 are defined with appropriate user defined names. Table 420 indicates the actions to be performed, the path to be executed or the parameters to be set when a qualified signal is received. For example, when label 421 is activated, Path #2 having a name "Say Hello" is executed. When label 431 is activated, the Motor M2 is set to run at speed setting #6, as controlled by pulse width modulation.

Figure 5:
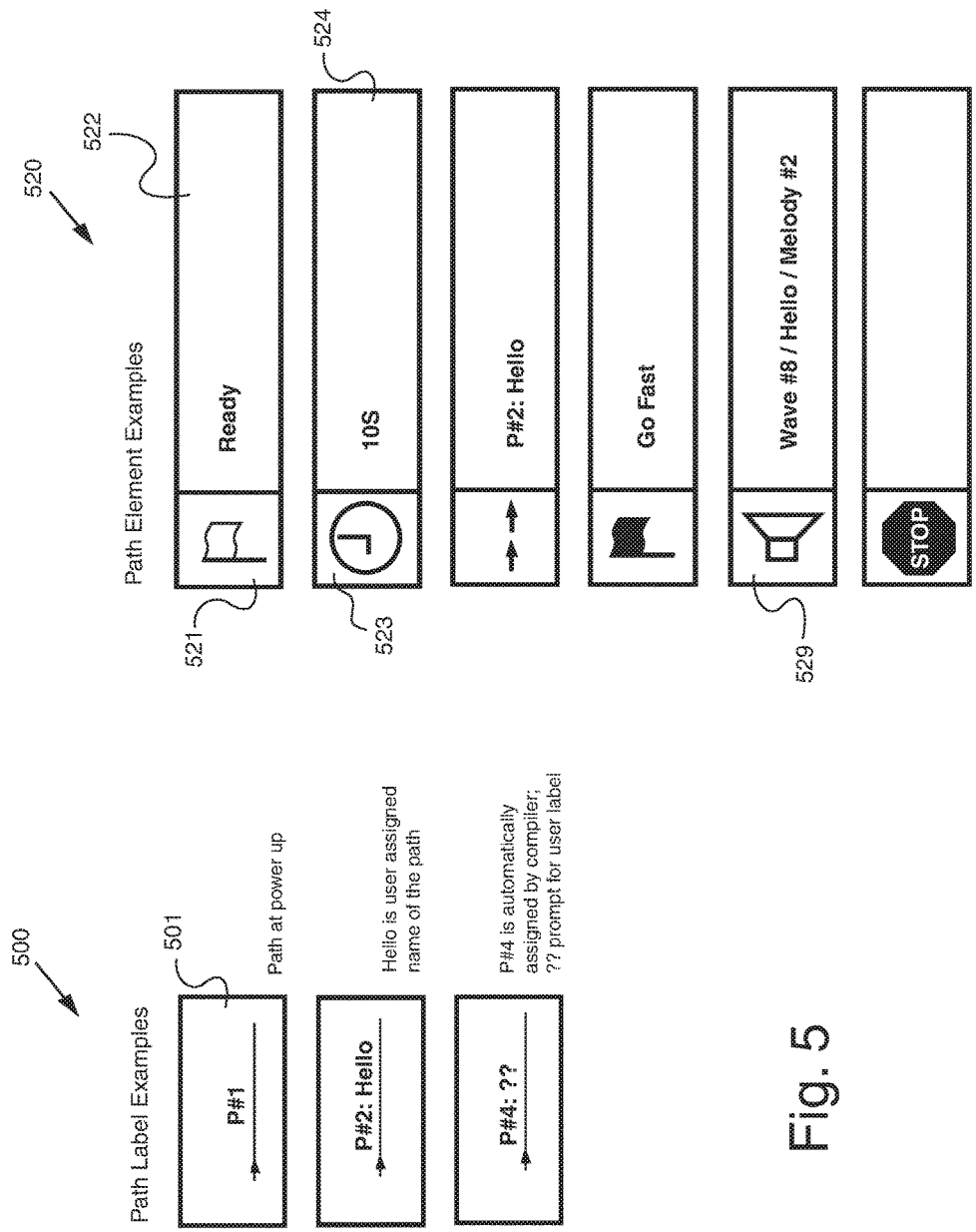
FIG. 5 demonstrated signs and labels used in Path table of visual Easy Format programming.

Table 500 of FIG. 5 indicates the path label examples. Label 501 indicates a power up default path P#1. This is the default path to be executed during power up. If the user forgot to define a path, blinking question mark will prompt the user to fill in the path name or to delete the path from the path table. A path can be deleted by dragging and dropping a path label to the recycle bin 230 of FIG. 2. Table 520 indicates examples of defining the event provided in a path equation. Labels 521 and 522 will set the state named "Ready" to become active. Label 523 and the data 524 will trigger an event to delay for 10 seconds. The symbol 529 of speaker represents an instruction to produce a voice and the voice produced by the path 529 are defined to be a wave file, a hello voice and a melody. Accordingly label 529 will generate three sounds "Wave#8", the "Hello" voice file and the "Melody#2" file respectively. Similar in technique to provide the instruction represented by a speaker sign of label of 529 to output a voice or sound, another instruction provided by another predefined sign is provided to output graphic or message to the display 1226 of FIG. 12.

Figure 6:
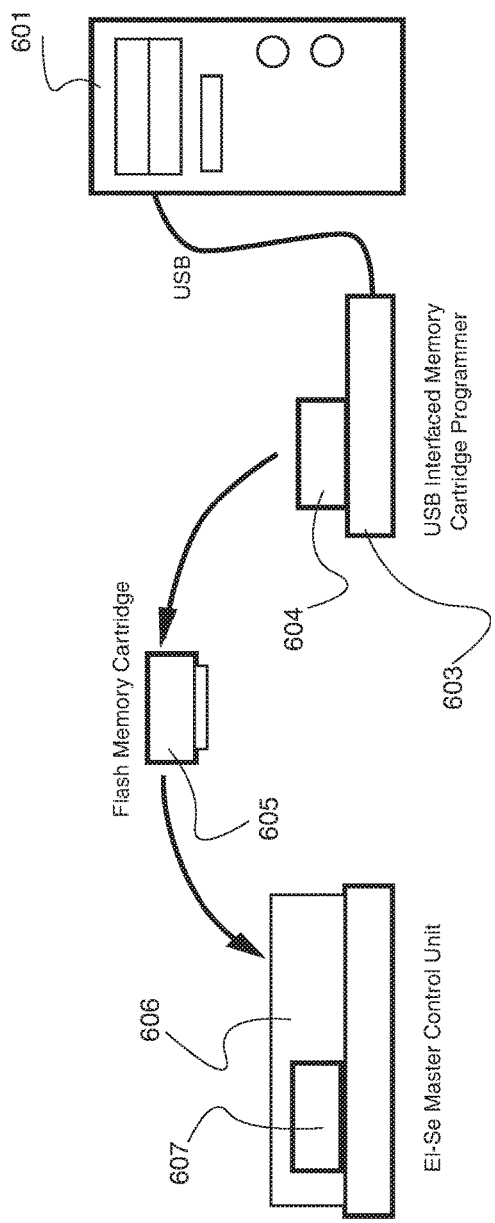
FIG. 6 illustrated an embodiment provided for a user to compile an Easy Format program and download the controller unit executable codes into a flash memory.

Attention is now directed to FIG. 6, which illustrated an embodiment for a user to compile an Easy Format program and to down load it to the controller unit of the building kit. The Easy Format compiler is installed in the computer 601. After an Easy Format program written by a user is compiled, the executable machine code data is programmed to a flash memory module 604 inserted to a programmer 603. The programmed flash memory cartridge is removed and represented by the cartridge 605. This cartridge becomes 607 when plug into the controller unit 606.

Figure 7:
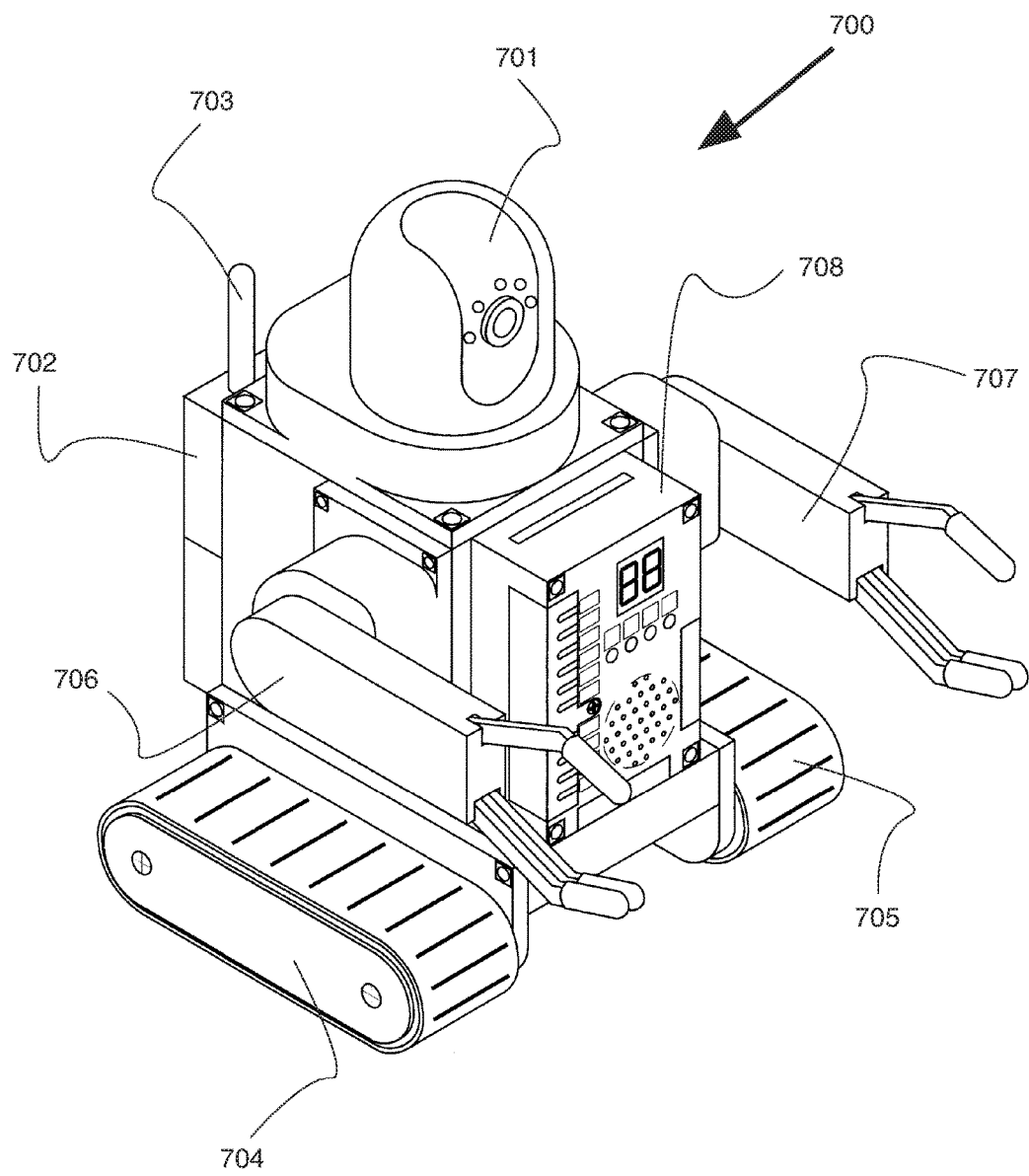
FIG. 7 demonstrated a robot built with an embodiment of mounting block and components of the retail building kit invented.

700 of FIG. 7 illustrated a robot built with exemplary embodiments of this invention. The robot comprises a controller unit . This controller unit comprises a controller housing 708 for enclosing a microprocessor or microcontroller to be programmed by the improved Easy Format programming software of FIG. 2 to FIG. 5. Two motorized belt drives 704 and 705 are installed to provide motion. Two robot arms 706 and 707 are provided to represent the arms and hands of the robot. The motors inside the motorized belt drives 704, 705 and the robot arms 706, 707 are accommodated by an accessory article member housing as illustrated. At the head of the robot is a digital camera which comprises another accessory member housing 701 to accommodate an optical sensor. At the back of the article is a RF (radio frequency) module 702 equipped with an antenna 703. This RF module is provided to transmit the video signal picked up by the robot and also to receive commands from a remote wireless control member operated by the user. All the robot arms 706, 707; the video camera module 701, the motorized belt drives 704 and the RF module 702 are all examples of the group of accessory article members provided with the retail building kit for users to assemble or build their designs such as the robot of FIG. 7. According to a person having ordinary knowledge in the art, the plain or ordinary meaning of the term "building kit" is defined as a collection of components enabling users to build articles designed by them. According to a person having ordinary knowledge in the art, the plain or ordinary meaning of the term "retail" means the components are packaged for retail purpose, or the components are distributed through retail channels to reach the users. It should also be noted that all the accessory article members of this robot project are mounted on a piece of solid wood block 710 in the shape of a cube with screws. The reason to use wood as the core anchor material is easy availability, low cost and easy to shape.

Figure 8:
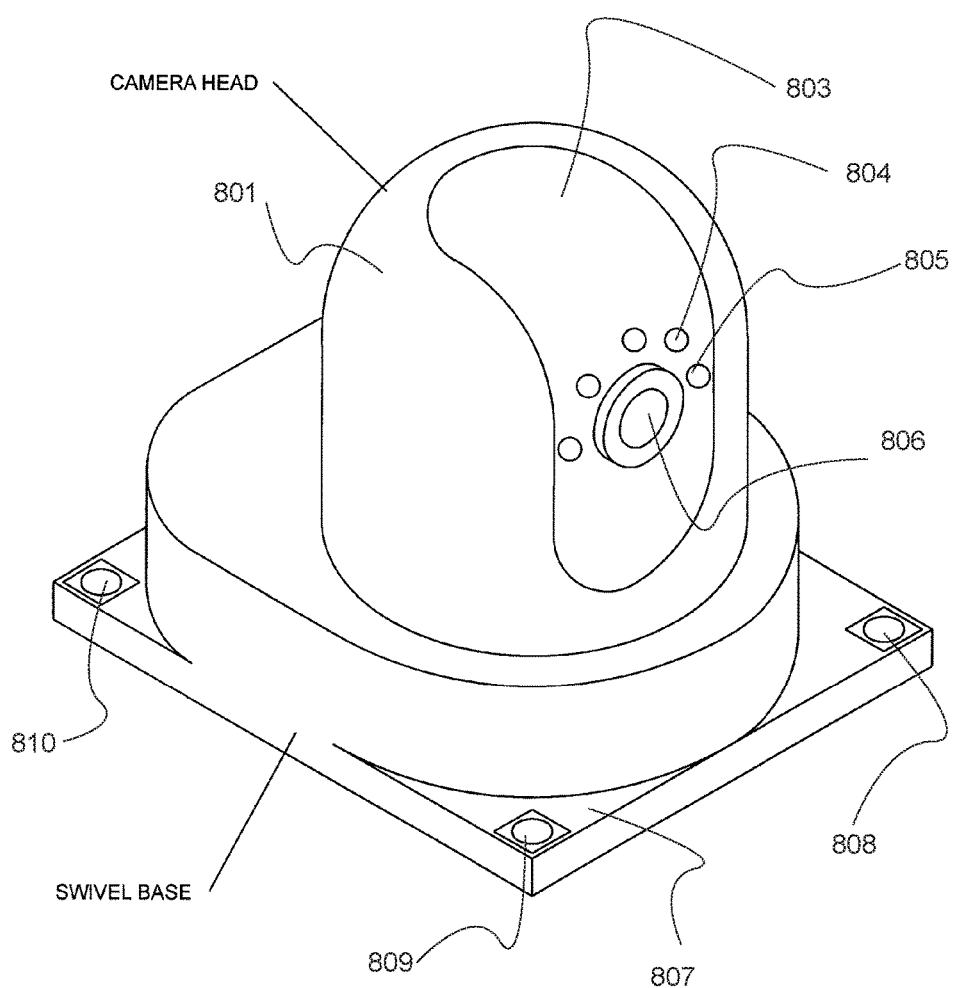
FIG. 8 illustrated an embodiment of an accessory article member represented by a digital camera.
Figure 9A:
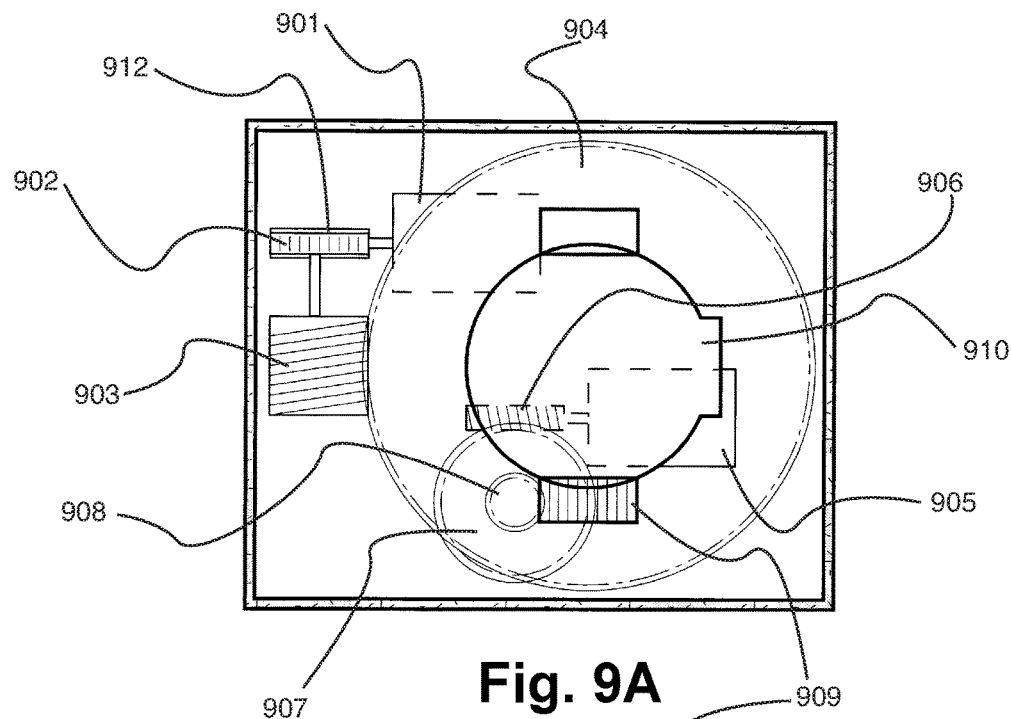
FIG. 9A illustrated the top see through view of the digital camera accessory article member embodiment.
Figure 9B:
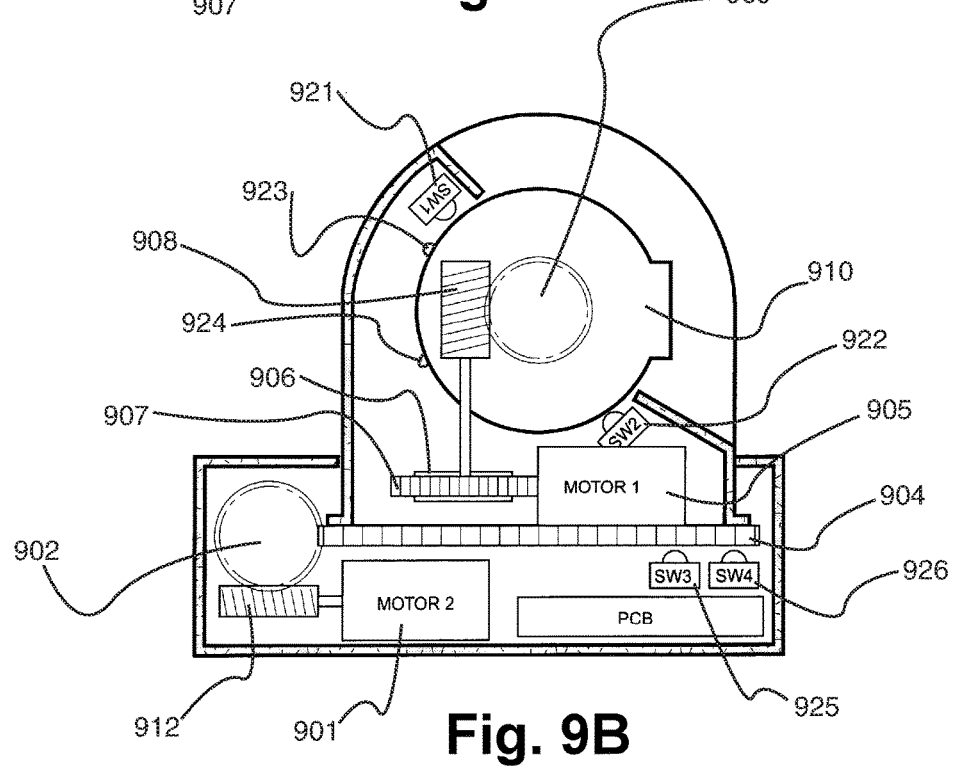
FIG. 9B illustrated the side see through view of the digital camera embodiment.

FIG. 8 illustrated an enlarged view of the digital camera 701 of FIG. 7. The lens 806 and the optical sensor or image sensor located behind the lens picks up the image. Lighting sources 804, 805 provides supplemental lighting when the article is operated in a dark environment. Inside the housing 801 is a movable subassembly 803 for the camera to pan and tilt against the base 807. Mounting holes 808 to 810 are provided for the camera to be mounted to the wood robot body. FIG. 9A and 9B demonstrates the internal structure of the digital camera. The motor 905 and gears 906, 907 908 and 909 provide the tilt motion. The motor 901 and the gears 912, 902, 903 and 904 provide the pan motion. Limit switches 921, 922 and bumps 923, 924 provide feed back signals to prevent the camera tile mechanism from exceeding the movement limits. Switches 925 and 926 provide protection to the pan mechanism. In order for the controller unit to communicate with this digital camera accessory member, numerous signal and power wires are required to provide power, pan and tilt signals and to received data representing the video image picked up. This real time work load is excessive to the microprocessor or microcontroller IC located inside the controller unit because it needs to communicate with the motorized belts, the four motors of the robot arms, the two motors of the camera module and the four limit switches all together at real time. In order to reduce the work load of the controller unit, a separated smaller microprocessor or microcontroller is provided on the PCB 928 to directly control the motors and limit switches of the camera module. With this design, the controller unit is required only to send brief pan and tilt commands to the microprocessor or microcontroller located inside the camera module.

Figure 10:
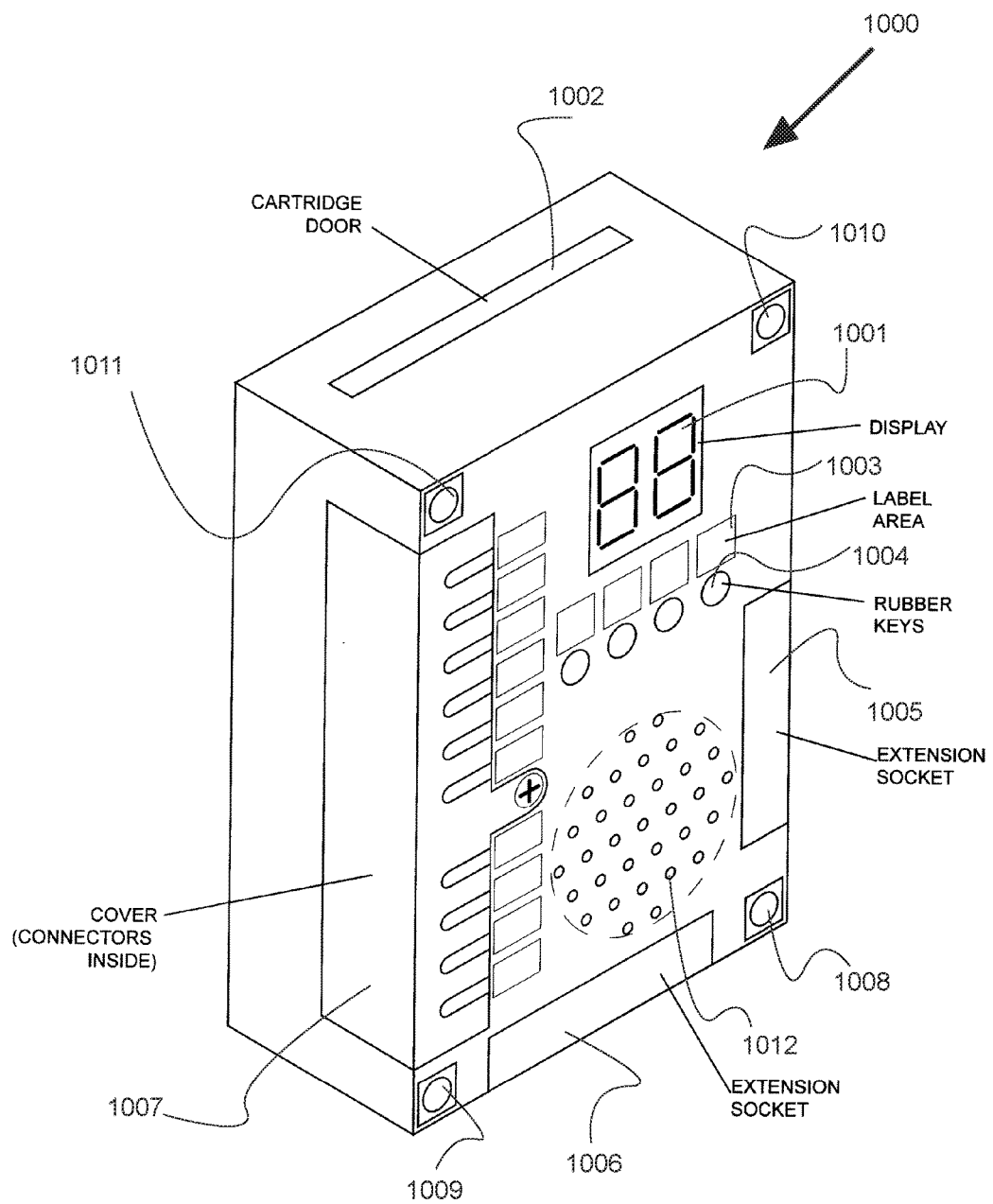
FIG. 10 illustrated an enlarged external view of an embodiment of controller unit.
Figure 11:
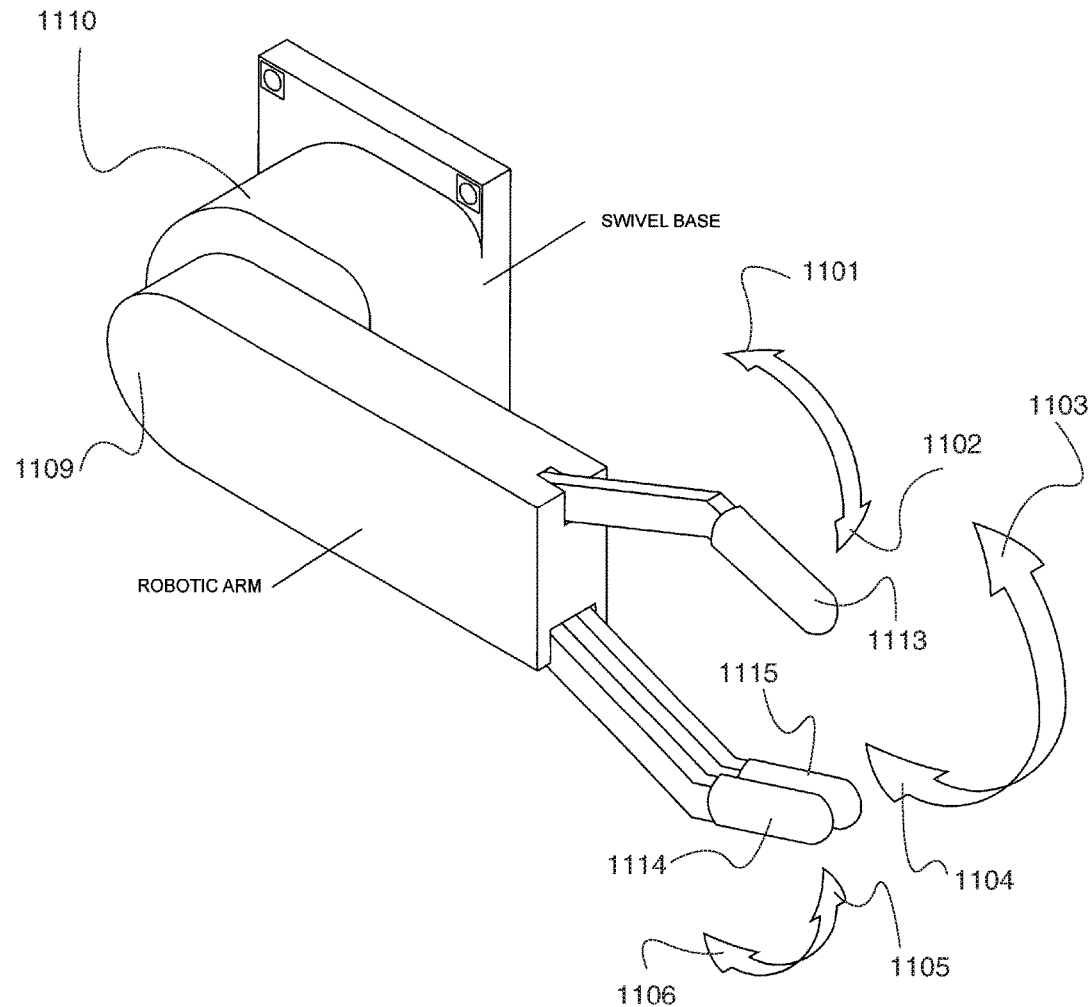
FIG. 11 illustrated the motional directions of another accessory article member representing a robot hand or arm.
Figure 12:
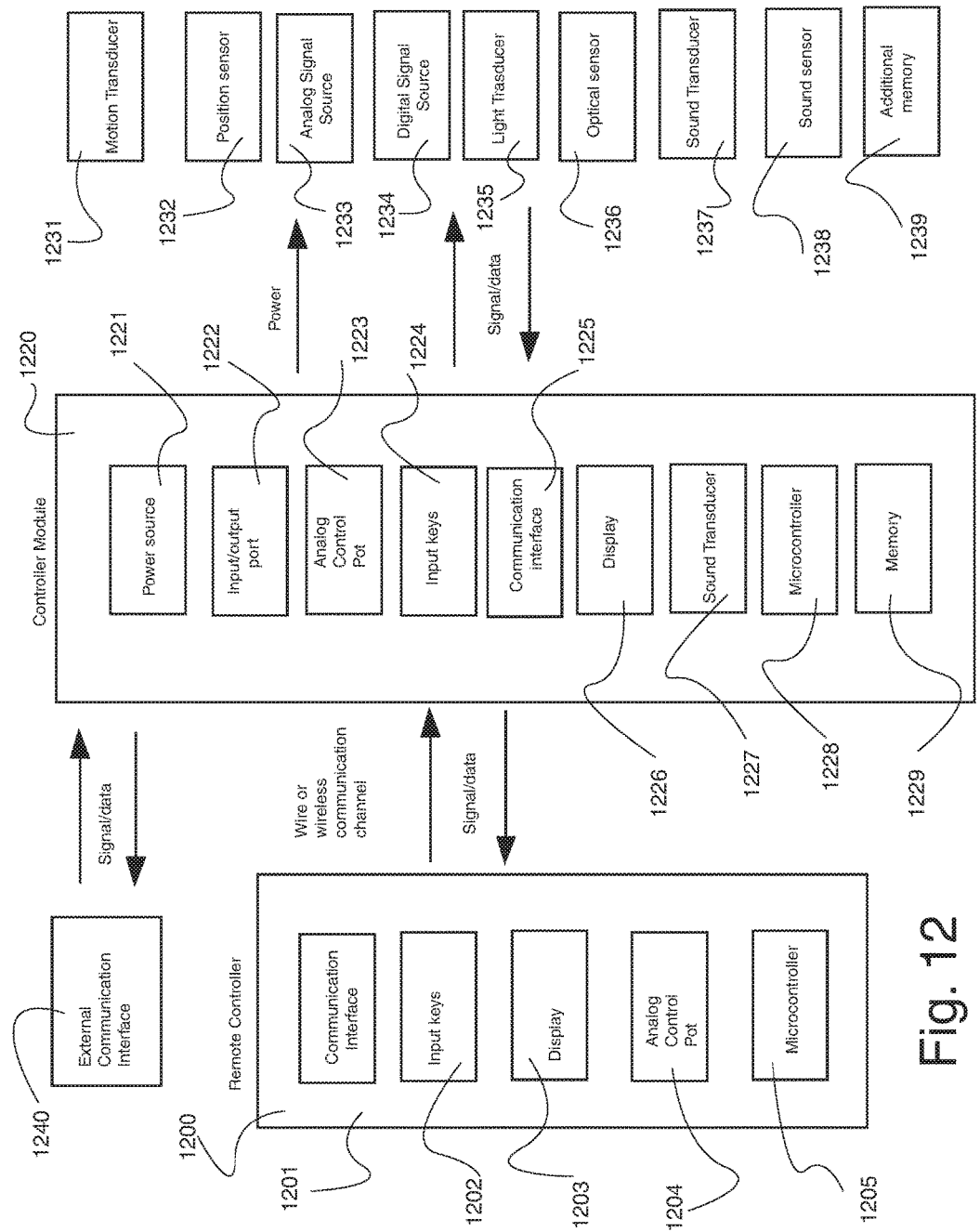
FIG. 12 demonstrated the block diagram of an embodiment of the building kits invented.

FIG. 10 illustrates a simple version of the controller unit 1000. At the front of the unit are two seven segments display 1001; four push button trigger switches 1004, switch label area 1003. Connector sockets and batteries hide inside the cover 1007. Extension sockets 1005 and 1006 enable the controller unit to provide more input/output ports or channels. A speaker is provided behind the grill 1012. Located at the four corners are the mounting holes 1008 to 1011. The slot 1002 is provided for the controller unit to receive programmed data from the computer where the Easy Format program is compiled. It should be noted that the two digits LED display may be reduced by high-density LCD panels for a better controller unit model. FIG. 11 demonstrated a motorized arm and hand assembly. One motor and gear assembly is provided to rotate the arm 1109 against the base 1110 towards the 1103 and 1104 directions. A second motor and gear assembly is provided to move the fingers 1113 to 1115 in the 1101, 1102, 1105 and 1106 directions. Similar to the pan and tilt mechanism of the camera module, clutch or limit switches are required inside the motorized arm mechanism to limit the traveling of the mechanism. It is also preferable to provide another microprocessor or microcontroller inside the arm assembly to control the two motors and the four switches. This design also allows the motorized arm assembly to communicate serially with the controller unit and therefore reduces many wires to be connected between the two members. Attention is now direct to FIG. 12, which illustrated a block diagram of the preferred embodiment of a complete building kit system. The controller unit 1220 may comprise input/output ports or channels 1222; analog control potentiometer 1223; analog control potentiometer 1204 for providing digital proportional controls such as that required by a servo mechanism; input key switches 1224 located at the front of the controller unit; communication interface 1225 which enables the controller unit to communicate through a remote control member 1220, or with external communication interface 1240, such as DSL, cable modem, telephone line or wireless cell phone channels to get in touch with a remote electronics device, such as a remote mobile phone or a remote computer, or a remote server. A LED or LCD display panel 1226 is preferred for the control unit to provide interactive display of image or messages. Alternately the display panel may locate at an external accessory unit for displaying graphic or message information. A sound transducer or speaker 1227 provides voice, music and sound effects. The core of the controller unit is the microprocessor or microcontroller 1228 and the programming memory 1229. The microprocessor or microcontroller 1228 is typically represented by a microprocessor IC or a module having a microprocessor IC. Power source 1221 of the article may be positioned outside the controller unit or contained within the controller unit 1220 as illustrated in FIG. 12.

The controller unit 1220 is connected with one or more accessory article members by the user. Typical examples of the accessory article members are the motion transducer 1231 such as motors and solenoid; position switches or sensors 1232; analog signal source 1233 to provide analog video signal, voice signals or other ambient signals; digital signal sources 1234 such as encoded voice signals or other digital messages or data; light transducers 1235 such as light bulb and LED; optical sensors or camera image sensor 1236; sound transducer 1237 such as peizo vibrator or speaker; sound sensor 1238 such as condenser microphone. Passive accessory article members include any structural components required to build the article. As discussed previously, local microprocessor or microcontroller and memory 1239 are preferred to be included in the structure of many different kinds of accessory article members to reduce the workload of the controller unit and to reduce the number of connecting wires required.

In order for a user to effectively communicate or to send commands to the controller unit, a remote control member 1200 is added to the system. This remote control member is connected to the controller unit by cable, wire or by wireless method such as radio frequency, infrared, or ultrasonic communication designs. The remote control member may also be equipped with a LED or LCD display panel or speakers for obtaining interactive audio/visual communication with the controller unit. Typical remote controller comprises communication interface circuit 1201; input keys 1202; display device 1203; analog control potentiometer 1204 for providing digital proportional controls such as that required by a servo mechanism and a microprocessor or microcontroller 1205. According to a person having ordinary skill in the art, such circuit of analog control potentiometer involves analog/digital converter, handling of analog signals and digital signals so as to achieve the servo mechanism function. In another application sample, the remote control member can be represented by a mobile phone. In this case the building kit will require a dialing circuit and/or a modem circuit to communicate with the wireless phone. This dialing and/or modem circuit may be installed inside the controller unit or positioned externally as an external accessory article member. Similar to the controller unit, a label area is provide for a user to define and label the function of the blank input keys according to the nature of the article designed, built and programmed by the user. It can be further observed from FIG. 12 that the controller unit is preferred to provide a bidirectional signal interface, either by serial data link or by parallel ports with the remote control members, some of the accessory article members and also with the external communication terminals such as phone line, cable line, modem or wireless communication channels. However, power supply feeding to the accessory article members is usually arranged in one direction.

Figure 13:
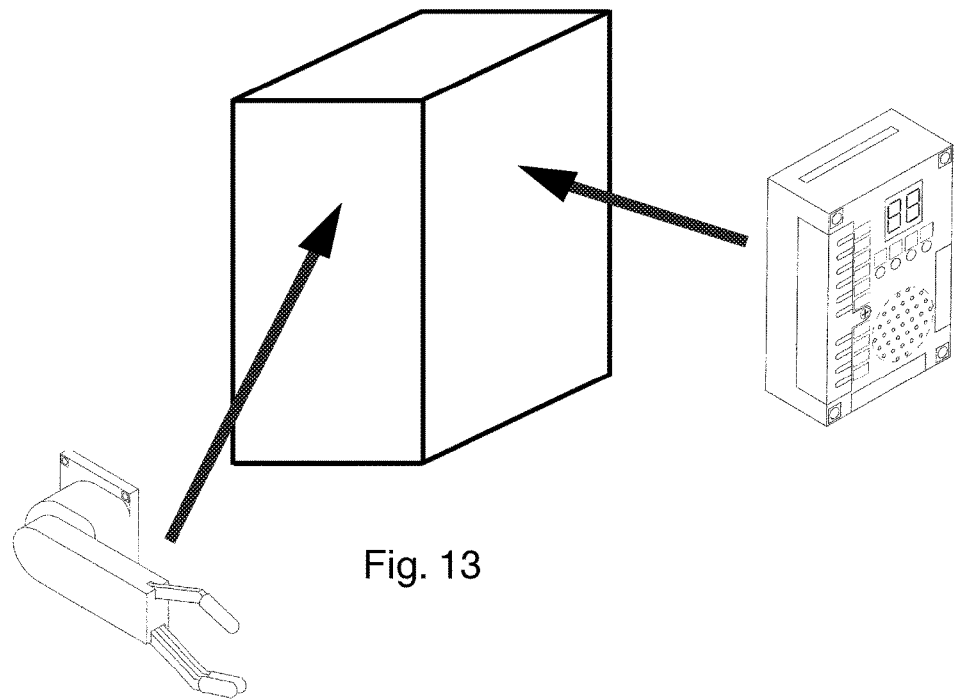
FIG. 13 illustrated an alternate embodiment of block for mounting components of the retail building kit.
Figure 14:
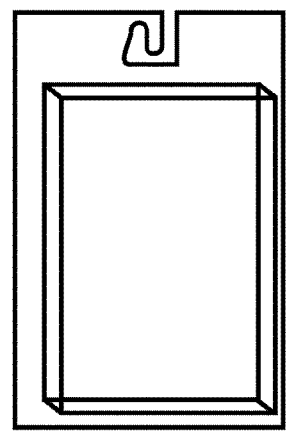
FIG. 14 illustrated an embodiment of packaging.
Figure 15:
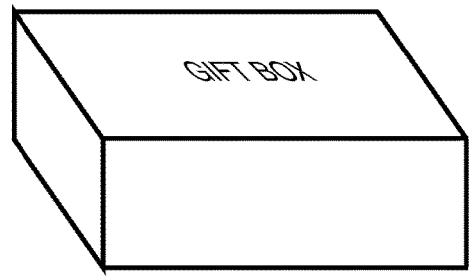
FIG. 15 illustrated an alternate embodiment of packaging.

FIG. 13 illustrated a mounting block suitable for mounting the components of the retail building kit. The block can be a wood block as disclosed herein, or specially designed mounting block such as the block 710 located beneath the camera 701 as illustrated in FIG. 7. FIGS. 16 and 17 illustrated embodiments of packaging commonly known to a person having ordinary knowledge in the art.

From the foregoing, it can be appreciated that the hardware and software embodiments of the programmable building kit have been adequately disclosed herein enabling engineers to develop the invention or hobby building systems invented. The preferred embodiments of the invention described herein are exemplary and numerous modifications, specification variations and circuit rearrangements can be readily envisioned to achieve an equivalent result, all of which are intended to be embraced within the scope of the appended claims.

I claim:

1. A building kit and a programming display configured for a user to build and program an article comprises:
   a programming system;
   a controller unit comprising a controller housing, a connector or an extension socket, and a microprocessor;
   at least one accessory article member separated from said controller unit and configured to be compatible for making connection with the connector or extension socket of said controller unit,
   wherein each accessory article member further comprises at least one of the following elements:
   (a) motion transducer;
   (b) position sensor;
   (c) analog signal provider;
   (d) digital signal provider;
   (e) light transducer;
   (f) optical sensor or camera image sensor;
   (g) sound transducer;
   (h) sound sensor;
   (i) memory; and
   (j) external communication circuit;
   wherein said building kit is further configured to be supported by said programming system;
   wherein said programming system is configured to work with said programming display for displaying and providing a program comprising a configuration state region and a path region; said programming system is further defined by the following programming features:
(1) a feature to define m input channels of said microprocessor or controller unit, and for said connector or extension socket to interface with external data or signals, wherein m is an integer equal or greater than one;
(2) a feature to define n output channels for said microprocessor or controller unit to transmit data or signals, wherein n is an integer equal or greater than one;
(3) a feature to specify and display a first program group of two or more configuration states in a configuration state region of said programming display, wherein each configuration state defines the configuration of at least one input channel of feature (1) and p output channel of feature (2) wherein p is zero or an integer greater than zero; and wherein each of said two or more configuration states is further configured to access the at least one accessory article member connected to said connector, or extension socket; said two or more configuration states are further configured to comply with the following feature (5);
(4) a feature to specify and display a second program group of two or more paths in a path region of said programming display; for said paths to be executed by said microprocessor or controller unit;
(5) within a configuration state of feature (3), provide a feature to define a qualifying condition for the at least one input channel; and to specify a path of feature (4) to be executed when the signal or data received by said at least one input channel satisfied said qualifying condition, and
(6) a feature to enable a path of feature (4) to switch from a current configuration state to another configuration state of feature (3);
wherein said programming system is further configured for said user to compose a user program according to the interaction between said first program group of feature (3) and second program group of feature (4);
wherein said programming system is further configured to work with said programming display for displaying and providing at least one of the following features:
(7) a feature to structure said user program into at least two regions, wherein a first configuration state region specifies the characteristics of the two or more configuration states, and a second path region specifies the two or more paths or events/sub-events;
(8) a feature to organize at least a part of said configuration states and/or paths into a table format;
(9) a feature to configure said states and paths for working in both of the following conditions:
(i) said configuration states or paths to be listed in sequential relationship to each other;
(ii) said configuration states and/or paths not to be listed in sequential relationship to each other;
(10) a feature to provide a symbol or label for representing said accessory article member; or for said program to specify the power up default condition of said user programmed article;
wherein said programming system further comprises one or more instructions tailored for representing the at least one accessory article member connected to said connector or extension socket, enabling said user to program the interaction of said controller unit with said accessory article member.

2. The building kit of claim 1 wherein said programming system comprises presentation of configuration states or paths in the form of a table, and one or more elements of said table comprises a programming instruction provided with a graphic presentation.

3. The building kit of claim 1 wherein a configuration state or a path of said programming system is further structured to provide a programming instruction explicitly specified to operate a motor, or a programming instruction specified to operate a light transducer, and said programming instruction further comprises a table format graphic sign of said motor or light transducer.

4. The building kit of claim 1 wherein said programming system comprises a programming instruction for said user to define a path enabling a graphic pattern or a message to be displayed.

5. The building kit of claim 1 wherein said programming system is structured to provide configuration state and path displayed on said programming display and for a user to key in or configure user defined configuration state and path labels.

6. The building kit of claim 5 wherein said programming display provides visual error signal of a configuration state or a path to prompt a user to correct missing or error entry according to the programming criteria of said programming system.

7. The building kit of claim 1 further comprising a remote control member connected to said controller unit by wired or wireless method and wherein said programming system further comprises a programming instruction structured for an operation of said remote control member.

8. The building kit of claim 7 wherein said programming system enables said controller unit to execute a path when a signal received from said remote control member satisfied a predefined qualification.

9. The building kit of claim 7 wherein said remote control member comprises at least a first input key and a second input key, and a labeling area provided for an user to define and label the function of said first and second input keys.

10. The building kit of claim 7 wherein said remote control member comprises a display and/or a sound transducer for providing visual and/or voice communication with said controller unit.

11. The building kit of claim 1 wherein said controller unit is configured to communicate with a remote electronics device.

12. The building kit of claim 1 further comprising wirings enable an accessory article member to receive signals from said controller unit or to be powered by said controller unit.

13. The building kit of claim 1 wherein an accessory article member of said building kit further comprises a microcontroller to interface with one of said elements.

14. The building kit of claim 1 wherein one of said accessory article members is not part of said controller unit; said building kit or a product line of building kit components is further configured for said user to select one or more of said accessory members for assembling or building said article.

15. The building kit of claim 1 wherein said programming system further comprises at least two of the features or characteristics (7) to (10).

16. A building kit and a programming display configured for a user to build and program an article, said building kit comprises:

a programming system;

a controller unit comprising a first microprocessor, a controller housing, and a connector or an extension socket accessed through said controller housing;

at least a first and a second accessory article members separated from said controller unit, wherein each accessory article member is configured for connecting with said controller unit through said connector or extension socket for building said article, wherein each of said accessory members comprises at least one of the following elements:
(a) motion transducer;
(b) position sensor;
(c) analog signal provider;
(d) digital signal provider;
(e) light transducer;
(f) optical sensor or camera image sensor;
(g) sound transducer;
(h) sound sensor;
(i) memory; and
(j) external communication circuit;

wherein said programming system is configured to provide the following programming features:
(1) a feature to define m input channels of said microprocessor or controller unit, and for said connector or extension socket to interface with external data or signals, wherein m is an integer equal or greater than one;
(2) a feature to define n output channels for said microprocessor or controller unit to transmit data or signals, wherein n is an integer equal or greater than one;
(3) a feature to specify and display a first program group of x configuration states in a configuration state region of said programming display, wherein each configuration state defines the configuration of at least one input channel of feature (1) and p output channel of feature (2); wherein x is an integer equal or greater than two and p is zero or an integer greater than zero; and wherein said configuration states are further configured to comply with the following feature (5);
(4) a feature to specify and display a second program group of y paths in a path region of said programming display; for said paths to be executed by said microprocessor or controller unit, wherein y is an integer equal or greater than two;
(5) within a configuration of feature (3), provide a feature to define a qualifying condition for the at least one input channel; and to specify a path of feature (4) to be executed when the signal or data received by said at least one input channel satisfied said qualifying condition, and
(6) a feature to enable a path of feature (4) to switch from a current configuration state to another configuration state of feature (3);

wherein said programming system is further configured for said user to compose a user program according to the interaction between said first program group of feature (3) and said second program group of feature (4); said programming system is further configured to work with said programming display for displaying and providing at least one of the following features or characteristics:
(7) a feature to structure the said user program into at least two regions, wherein a first configuration state region specifies the characteristics of the two or more configuration states, and a second path region specifies the two or more paths or events/sub-events;
(8) a feature to organize at least a part of the data specified by said features into a table format;
(9) wherein said configuration states and paths are not necessary to be listed in sequential relationship to each other;
(10) a feature to provide a symbol or a label for representing said first and/or second accessory article member; or for specifying the power up default condition of said user programmed article;

wherein said building kit further comprising a remote hand control member configured for connecting to said controller unit by wired or wireless method; and wherein said programming system is configured with programming instructions specific to said remote hand control member and compatible with said programming features (1) to (6) of said programming system.

17. The building kit of claim 16 wherein said programming system further comprises a programming instruction specifically assigned for representing said first accessory article member in a configuration state or a path, enabling said user to program the interaction of said controller unit with said first accessory article member.

18. The building kit of claim 16 wherein one of said accessory article members comprises a second microprocessor; and wherein said programming system is structured to provide a code as an output signal; and said second microprocessor controls at least one of said elements according to the nature of said code.

19. The building kit of claim 16 further comprising a remote control member connected to said controller unit by wired or wireless method, and said programming system is structured to enable said first microprocessor to execute a path when the signal received from said remote control member satisfies a predefined qualification.

20. The building kit of claim 16 wherein said second microprocessor provides a code to said controller unit according to a signal provided by at least one of said elements.

21. The building kit of claim 16 further comprising a building kit display and/or a sound transducer for a user to communicate with said controller unit.

22. The building kit of claim 16 further comprising one or more pieces of mounting blocks configured for mounting said controller unit and an accessory article member together.

23. A building kit and a programming display configured for a user to build and program an article comprises:

a programming system;

a controller unit comprising a controller housing, a connector or an extension socket, and a microprocessor;

one or more accessory article members separated from said controller unit and configured to be compatible for making connection with the connector or extension socket of said controller unit, wherein each accessory article member further comprises at least one of the following elements:
(a) motion transducer;
(b) position sensor;
(c) analog signal provider;
(d) digital signal provider;
(e) light transducer;
(f) optical sensor or camera image sensor;
(g) sound transducer;
(h) sound sensor;
(i) memory; and (j) external communication circuit;

wherein said building kit is further configured to be supported by said programming system with the following features:

(1) a feature to define m input channels of said microprocessor or controller unit, and for said connector or extension socket to interface with external data or signals, wherein m is an integer equal or greater than one;

(2) a feature to define n output channels for said microprocessor or controller unit to transmit data or signals, wherein n is an integer equal or greater than one;

(3) a feature to specify and display x configuration state in a configuration state region of said programming display, wherein each configuration state defines the configuration of at least one input channel of feature (1) and p output channel of feature (2) and wherein x is an integer equal or greater than one, and p is zero or an integer greater than zero; and wherein said configuration states are further configured to comply with the following feature (5);

(4) a feature to specify and display y paths in a path region of said programming display; for said paths to be executed by said microprocessor or controller unit, wherein y is an integer equal or greater than one;

(5) within a configuration of feature (3), provide a feature to define a qualifying condition for the at least one input channel; and to specify a path to be executed when the signal or data received by said at least one input channel satisfied said qualifying condition and (6) a feature to enable a path to switch from a current configuration state to another configuration state;

wherein said programming system is further configured to work with said programming display for displaying and providing at least one of the following features:

(7) a feature to structure the said user program into at least two regions, wherein a first configuration state region specifies the characteristics of one or more of the configuration states, and a second path region specifies one or more of the paths or events/sub-events;

(8) a feature to organize at least a part of said configuration states and/or paths into a table format;

(9) a feature to configure said states and paths for working in both of the following conditions:
  (i) said configuration states or paths to be listed in sequential relationship to each other;
  (ii) said configuration states and/or paths not to be listed in sequential relationship to each other;

(10) a feature to label part of a table format program for specifying the power up default condition of said user programmed article; wherein said building kit further comprises a remote control member connected to said controller unit by wired or wireless method; and wherein said programming system further comprises a programming instruction structured for the operation of said remote control member with said features (1) to (6).

24. The building kit of claim 23 wherein said programming system enables said controller unit to execute a path when a signal received from said remote control member satisfies a predefined qualification.

25. The building kit of claim 23 further comprises a camera, and wherein said programming system enables said camera to be controlled by said remote control member.

26. The building kit of claim 23 wherein said remote control member is a hand held device.

* * * * *